(12) United States Patent
Brazier

(10) Patent No.: US 11,396,952 B2
(45) Date of Patent: Jul. 26, 2022

(54) RUPTURE DISK

(71) Applicant: BS&B Innovations Limited, Limerick (IE)

(72) Inventor: Geoffrey Brazier, Woodbury, MN (US)

(73) Assignee: BS&B Innovations Limited, Limerick (IE)

( * ) Notice: Subject to any disclaimer, the term of this patent is extended or adjusted under 35 U.S.C. 154(b) by 0 days.

(21) Appl. No.: 16/755,292

(22) PCT Filed: Oct. 11, 2018

(86) PCT No.: PCT/US2018/055486
§ 371 (c)(1),
(2) Date: Apr. 10, 2020

(87) PCT Pub. No.: WO2019/075255
PCT Pub. Date: Apr. 18, 2019

(65) Prior Publication Data
US 2021/0222786 A1 Jul. 22, 2021

Related U.S. Application Data
(60) Provisional application No. 62/571,402, filed on Oct. 12, 2017.

(51) Int. Cl.
*F16K 17/40* (2006.01)
*F16K 17/16* (2006.01)

(52) U.S. Cl.
CPC .......... *F16K 17/16* (2013.01); *F16K 17/1606* (2013.01); *Y10S 137/91* (2013.01)

(58) Field of Classification Search
CPC ..... F16K 17/16; F16K 17/1606; Y10S 137/91
(Continued)

(56) References Cited

U.S. PATENT DOCUMENTS 2,440,462 A 4/1948 Cooper
3,908,684 A * 9/1975 Short .................. F16K 17/1613
137/68.26

(Continued)

FOREIGN PATENT DOCUMENTS

CN 101184947 A 5/2008
CN 103545741 A 1/2014
(Continued)

OTHER PUBLICATIONS

International Search Report in corresponding PCT Application No. PCT/US2018/055486 dated Apr. 18, 2019 (5 pages).
(Continued)

*Primary Examiner* — Minh Q Le
(74) *Attorney, Agent, or Firm* — Finnegan, Henderson, Farabow, Garrett & Dunner, LLP

(57) ABSTRACT

This disclosure relates to a rupture disk (400), which may include a flange portion (401), a reverse-buckling dome portion (403), and a transition portion (402) joining the flange portion to the reverse-buckling dome portion. The dome portion may define an apex. The dome portion may further define an indentation (404) at the apex and/or a line of weakness (405), which may be proximate to the transition portion and/or may include a relatively weak segment configured to initiate rupture. An integral stress concentrating feature may be provided. A line of weakness and/or a base of a domed portion may be non-circular. The disclosure also relates to a rupture disk crimped into a holder (410). The disclosure also relates to a container having a wall that defines a rupturable portion.

23 Claims, 5 Drawing Sheets

(58) Field of Classification Search
USPC ......... 137/68.26, 68.19, 68.21, 68.22, 68.23, 137/68.25, 68.28, 68.11
See application file for complete search history.

(56) References Cited

U.S. PATENT DOCUMENTS

| | | | | |
|---|---|---|---|---|
| 4,436,218 | A * | 3/1984 | Beese | F16K 17/16 |
| | | | | 137/68.26 |
| 4,669,626 | A * | 6/1987 | Mozley | F16K 17/1606 |
| | | | | 137/68.26 |
| 4,759,460 | A * | 7/1988 | Mozley | F16K 17/1606 |
| | | | | 137/68.26 |
| 4,819,823 | A * | 4/1989 | Kadakia | F16K 17/162 |
| | | | | 220/89.2 |
| 5,570,803 | A | 11/1996 | Farwell | |
| 6,006,938 | A * | 12/1999 | Mozley | F16K 17/1606 |
| | | | | 137/68.19 |
| 6,065,485 | A * | 5/2000 | Rooker | F16K 17/1606 |
| | | | | 137/68.24 |
| 6,178,983 | B1 * | 1/2001 | Culliinane | F16K 17/1606 |
| | | | | 137/68.26 |
| 6,792,964 | B2 * | 9/2004 | Farwell | F16K 17/162 |
| | | | | 137/68.25 |
| 6,959,828 | B2 * | 11/2005 | Eijkelenberg | B65D 90/36 |
| | | | | 137/68.25 |
| 7,234,481 | B2 * | 6/2007 | Henderson | F16K 17/162 |
| | | | | 137/68.26 |
| 7,600,527 | B2 * | 10/2009 | Shaw | B23K 26/40 |
| | | | | 137/68.27 |
| 7,735,671 | B2 * | 6/2010 | Eijkelenberg | B65D 90/36 |
| | | | | 220/89.2 |
| 8,333,212 | B2 * | 12/2012 | Shaw | F16K 17/1606 |
| | | | | 137/15.18 |
| 8,525,055 | B2 * | 9/2013 | Brazier | G01N 19/00 |
| | | | | 200/83 R |
| 2001/0011471 | A1 * | 8/2001 | Cullinane | F16K 17/1606 |
| | | | | 72/379.2 |
| 2008/0202595 | A1 * | 8/2008 | Melrose | F16K 17/1606 |
| | | | | 137/68.23 |
| 2010/0178539 | A1 * | 7/2010 | Elia | H01M 50/578 |
| | | | | 429/56 |
| 2010/0224603 | A1 * | 9/2010 | Modena | B23K 26/364 |
| | | | | 219/121.72 |
| 2013/0056085 | A1 | 3/2013 | Tomasko | |
| 2014/0238984 | A1 | 8/2014 | Walker | |
| 2015/0053279 | A1 * | 2/2015 | Farwell | F16K 17/406 |
| | | | | 137/68.11 |
| 2016/0146363 | A1 | 5/2016 | Goggin | |

FOREIGN PATENT DOCUMENTS

| | | |
|---|---|---|
| CN | 106352126 A | 1/2017 |
| CN | 106461104 A | 2/2017 |
| CN | 101675210 A | 3/2020 |

OTHER PUBLICATIONS

Written Opinion of the International Searching Authority in corresponding PCT Application No. PCT/US2018/055486 dated Apr. 18, 2019 (9 pages).
Chinese Office Action with Search Report dated Dec. 1, 2021 in Chinese Patent Application No. 201880077354.2.

* cited by examiner

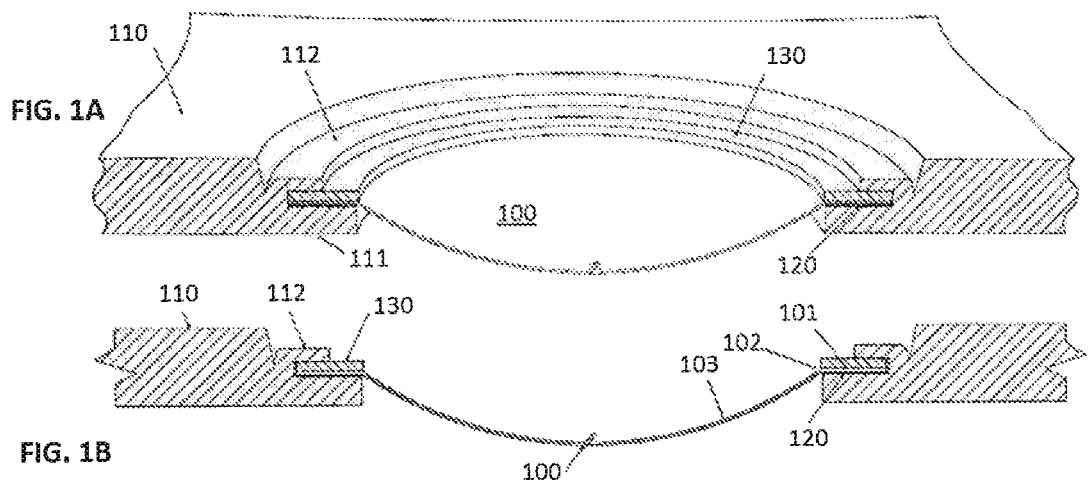
FIG. 1A
FIG. 1B
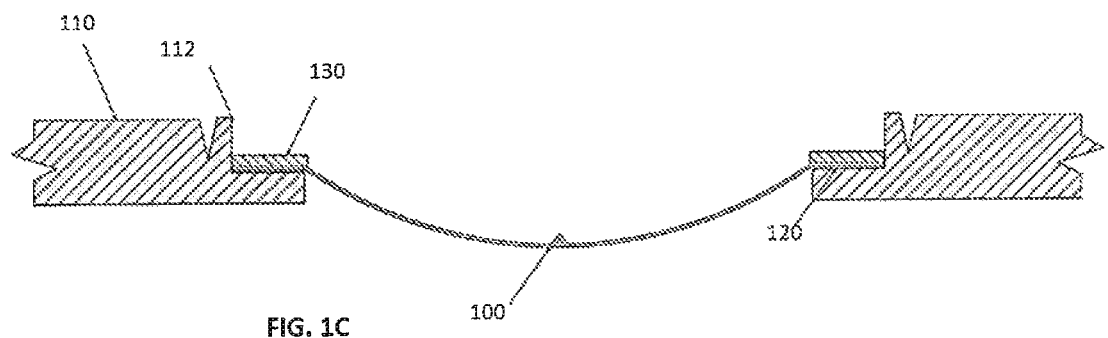
FIG. 1C
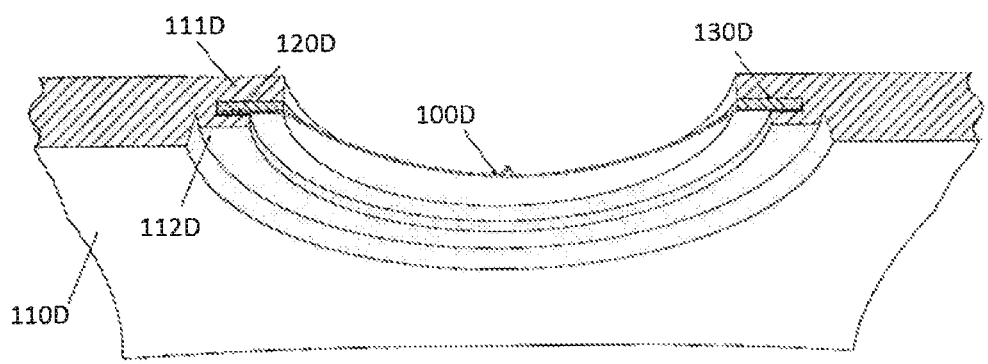
FIG. 1D

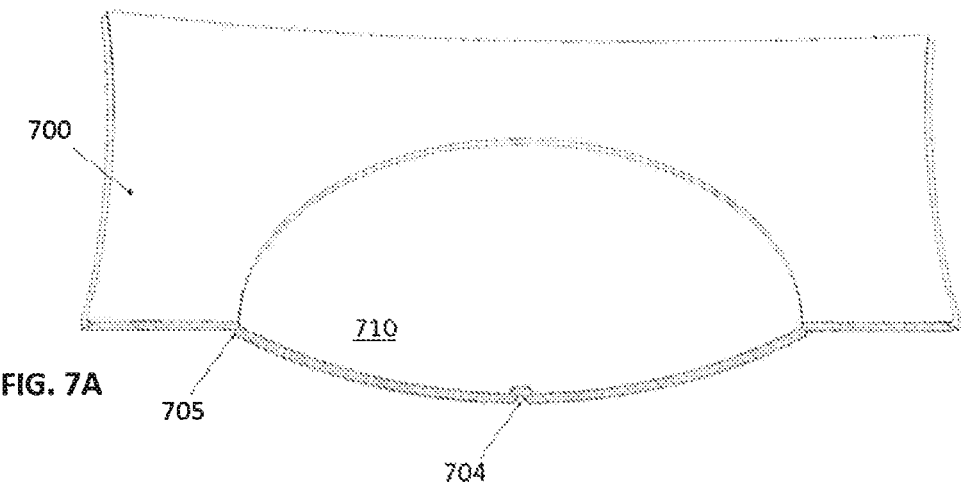
FIG. 7A
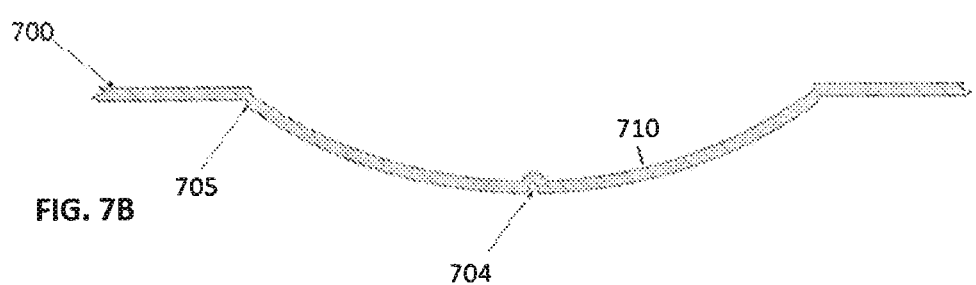
FIG. 7B
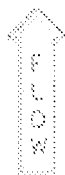
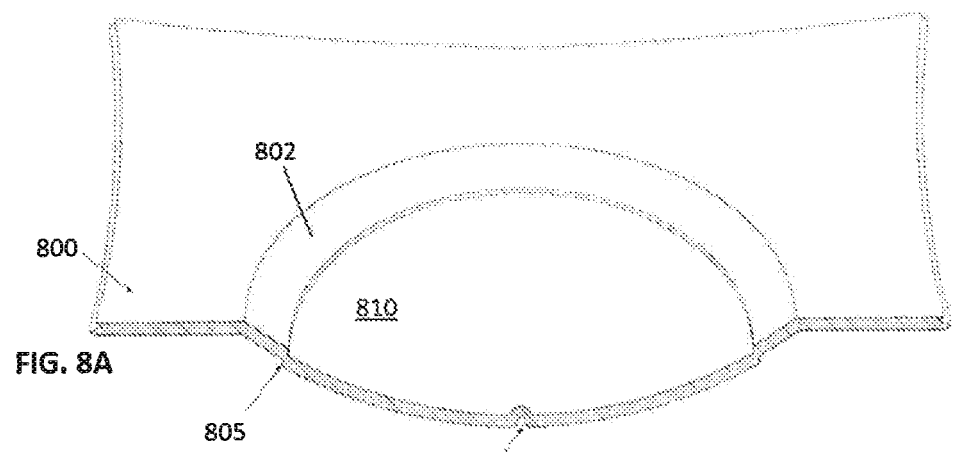
FIG. 8A
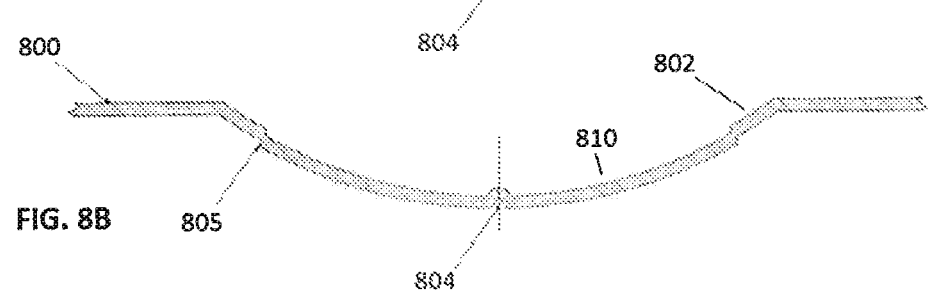
FIG. 8B

RUPTURE DISK

CROSS-REFERENCE TO RELATED PATENT APPLICATIONS

This is a National Phase of International Application No. PCT/US2018/055486, filed Oct. 11, 2018, which claims the benefit of U.S. Provisional Application No. 62/571,402 filed Oct. 12, 2017. The entire contents of the above-referenced applications are expressly incorporated herein by reference.

FIELD

The present disclosure relates to a rupture disk suitable for use with a sealed, partially sealed, and/or pressurized system.

BACKGROUND

There are many types of systems that process, transport, store, or utilize fluid, which may be sealed in a container. The fluid may be a liquid, gas, or a mixture of a liquid and gas. The fluid may also include solid components. For example, a system may contain a gas that includes solid particulates. As another example, a system may transport solid components in a fluid environment. A sealed container may be pressurized. Alternatively, the sealed container may contain a process (e.g., chemical) that may become pressurized. To ensure the safety of these types of sealed systems, each such system typically includes a safety device designed to prevent (or at least provide an alarm indication during) the over-pressurization of the system. In an emergency situation, pressure inside the sealed container acts on the safety device to create an opening to release fluid from the system at a chosen location. Outside of creating an opening, the safety device may simply provide an alert warning, indicating that a dangerous over-pressure situation is occurring or may be about to occur. In devices that actually rupture, or otherwise open, venting fluid to the environment or a safety reservoir through the opening reduces the pressure in the system and prevents another portion of the system from failing due to the high pressure of the fluid.

A rupture disk is one commonly used example of a safety device. A rupture disk can be attached to a sealed system to expose a certain portion of the rupture disk to the fluid in the system. A portion of the rupture disk exposed to the fluid is configured to rupture or tear when the fluid in the container reaches a predetermined pressure. The tearing or rupture of the disk creates an opening through which the pressurized fluid flows to reduce the pressure in the system. A rupture disk may include a line of weakness designed to ensure opening at a particular location, in response to a particular pressure, and in a particular "burst pattern." A line of weakness may be provided by way of a laser, mechanical displacement or thinning, or chemical etching process that involves removing material from a portion of the disk or displacing material from a portion of the disk, A line of weakness also may be created through a partial shearing process, as described in co-owned U.S. Pat. No. 5,934,308, the entire contents of which are hereby incorporated by reference as if set forth herein.

In the field of "reverse-buckling" rupture disk pressure relief devices, a concave/convex-shaped structure has been used as a means of providing a reliable and reproducible pressure responsive device, Known reverse-buckling devices are designed such that when the convex side of the structure is exposed to a predetermined overpressure force, the structure buckles and inverts, causing the convex side to collapse into a concave shape. The rupture disk may be designed not only to invert, but also to open by means of a line of weakness.

There is a need for a pressure response device that overcomes one or more deficiencies in the art and/or provides additional benefits.

BRIEF DESCRIPTION OF THE DRAWINGS

FIG. 1A illustrates a down-stream perspective cross-sectional view of a rupture disk and holder.

FIG. 1B illustrates a cross-sectional view of the rupture disk and holder of FIG. 1A with a crimp in a crimped position.

FIG. 1C illustrates cross-sectional view of the rupture disk and holder of FIG. 1A with a crimp in an un-crimped position.

FIG. 1D illustrates an up-stream perspective cross-sectional view of the rupture disk an holder of FIG. 1A.

FIG. 7A illustrates a cross-sectional perspective view of a wall including an integral rupture element.

FIG. 7B illustrates a cross-sectional view of the wall of FIG. 7A.

FIG. 8A illustrates a cross-sectional perspective view of another embodiment of a wall including an integral rupture element.

FIG. 8B illustrates a cross-sectional view of the wall of FIG. 8A.

DESCRIPTION OF THE EMBODIMENTS

Figure 2:
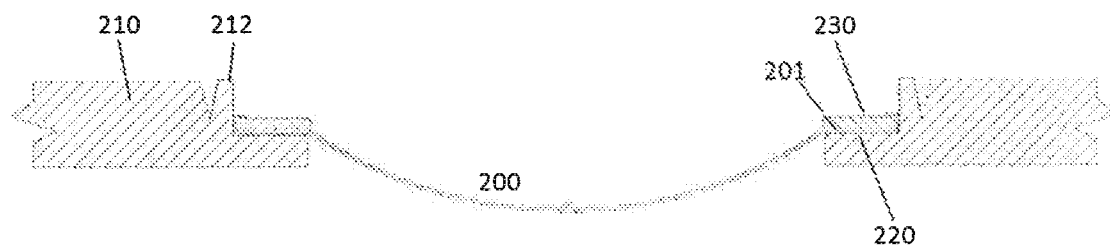
FIG. 2 illustrates a cross-sectional view of a rupture disk engaged with a support ring.

Reference will now be made in detail to the present exemplary embodiments, examples of which are illustrated in the accompanying drawings. Wherever possible, the same reference numbers will be used throughout the drawings to refer to the same or like parts. The drawing figures of this application are intended to provide a general understanding of the working elements of the underlying system. Accordingly, unless explicitly stated, the figures do not represent a literal depiction of proportional dimensions or the precise locations for the illustrated inter-related components.

FIGS. 1A-1C illustrate an embodiment of the present disclosure. As illustrated, a rupture disk 100 has a flange 101 and a central portion 103 connected by a transition portion 102. As illustrated, the flange 101 is positioned between an upstream seal 120 and a downstream support ring 130. In the illustrated embodiment, the flange 101, seal 120, and ring 130 are held in place against a flange 111 of a holder 110 by way of a crimp 112. FIG. 1C illustrates the embodiment of FIGS. 1A-1C before the crimp 112 has been bent downward to hold the flange 101, seal 120, and ring 130 in place.

As illustrated in FIGS. 1A-1C, rupture disk 100 is a reverse-acting rupture disk, configured to be oriented with its convex surface toward the sealed interior of a container and/or a pressurized volume. The rupture disk 100 is configured to reverse in response to an overpressure condition in the sealed interior of the container and/or pressurized volume. In one embodiment, the rupture disk 100 may be configured to "burst" or tear open upon reversal, thereby allowing pressurized fluid to escape. In another embodiment, the rupture disk 100 may be configured to reverse without opening, thereby providing a visual indication of an overpressure condition (without releasing pressurized fluid from the container/volume).

In the embodiment illustrated in FIGS. 1A-IC, rupture disk 100 is installed from the downstream/outlet side of the holder 110. It is contemplated that a rupture disk may alternatively be installed from the upstream/Inlet side of a holder, as illustrated in FIG. 1D.

The seal 120 may be any number of suitable seals, including an elastomeric gasket, a metal gasket, or an adhesive. It is also contemplated that a rupture disk 100 may be installed directly against the flange 111 of a holder 110 without a separate intervening seal 120 component. For example, one or both of the rupture disk flange 101 and holder flange 111 may be provided with surface features configured to create a mechanical seal (e.g., a bite seal) with the other component.

It is further contemplated that a crimp 112 may create a fluid-tight seal at the downstream/outlet side of the rupture disk flange 101 when crimped into position. For example, the support ring 130 may be a gasket or a spring washer, which may mate with and/or be compressed by the crimp 112, thereby creating a seal. As another example (not illustrated), a gasket or spring washer may be provided as an additional component to the support ring 130—e.g., a spring washer may be positioned between the crimp 112 and support ring 130 to create a seal. As still another example, an adhesive may be provided between the crimp 112 and the support ring 130 to create a seal. As a further example, one or both of the crimp 112 and support ring 130 may be provided with surface features configured to create a mechanical seal (e.g., a bite seal) with the other component.

An additional embodiment of a seal is illustrated in FIG. 2, As shown, a rupture disk 200 has a flange 201 engaged with a support ring 230. A pocket gasket 220 encircles the outer circumference of the flange 201 and support ring 230. The pocket gasket 220 may form a seal with the holder 210. FIG. 2 depicts a crimp 212 before it has been bent to hold the flange 201 and support ring 230 into position. In one embodiment, bending the crimp 212 into position may increase the effectiveness of the seal created by the pocket gasket 220.

Figure 3A:
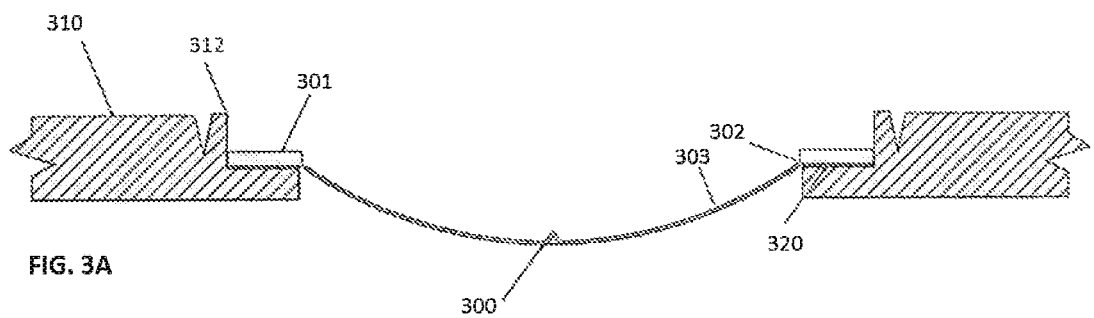
FIG. 3A illustrates a cross-sectional view of a rupture disk provided with an integral support ring.
Figure 3B:
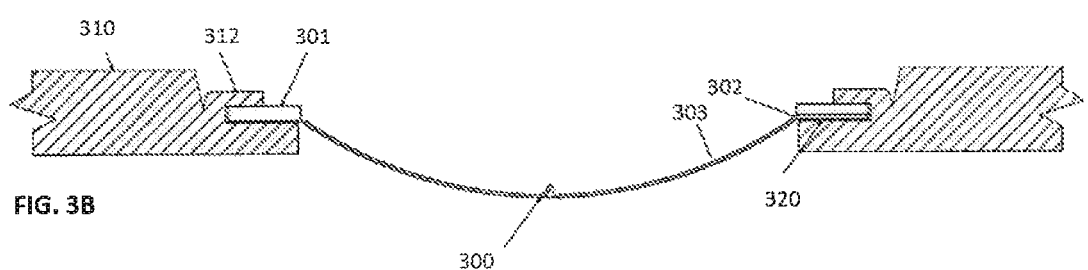
FIG. 3B illustrates a cross-sectional view of the rupture disk of FIG. 3A, crimped into place.

Although FIGS. 1A-1D and 2 illustrate a support ring 130, 230 as a separate component from the rupture disk 100, 200, it is contemplated that a rupture disk may be provided with an integral support ring (e.g., the components may be formed from a single piece of material). One such embodiment is illustrated in FIGS. 3A-3B. As illustrated, rupture disk 300 has an integral support ring 301 connecting to a central portion 303 by a transition portion 302. The support ring 301 may be held into place by way of a crimp 312 in a manner similar to that described above in connection with FIGS. 1A-1D. Further, the support ring 301 may be provided with a seal 320, or may otherwise be provided with an upstream or downstream seal in a manner similar to that described above in connection with FIGS. 1A-1D and FIG. 2.

Providing a rupture disk 300 with an integral support ring 301 may provide advantages. For example, using an integral support ring minimizes the number of components required to install a rupture disk. Further, using an integral support ring minimizes the number of potential leak paths, thereby increasing reliability.

Figure 4:
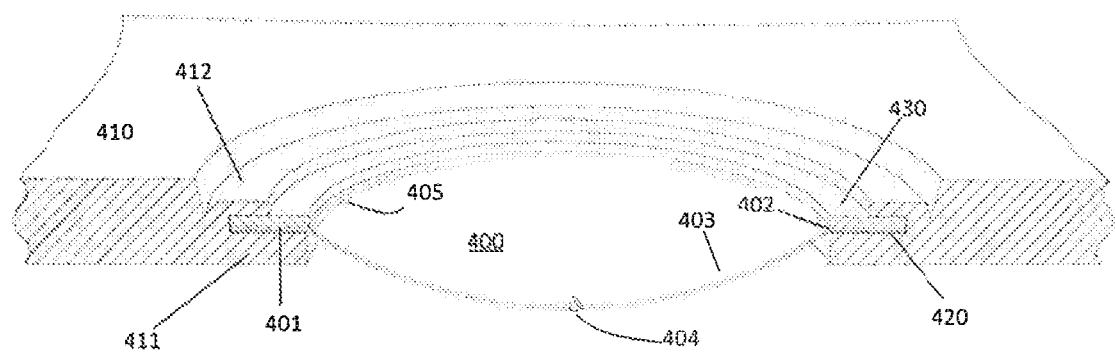
FIG. 4 illustrates a perspective cross-sectional view of a rupture disk having a line of weakness.

In an embodiment in which a rupture disk 100, 200, 300 is designed to rupture upon reversal, the rupture disk may be provided with one or more lines of weakness, which may define a line along which the disk may tear. An exemplary line of weakness is illustrated in FIG. 4. In FIG. 4, a rupture disk 400 is provided with a flange 401 linked to a central portion 403 by a transition portion 402. As illustrated, the flange 401 is positioned between a seal 420 and support ring 430. A crimp 412 holds the flange 401, seal 420, and support ring 430 in place against the flange 411 of a holder 410. The rupture disk 400 defines a line of weakness 405, along which the rupture disk 400 will tear upon reversal. The line of weakness may be created by any suitable method, such as stamping, shearing, or material removal (e.g., via scoring, laser ablation, chemical etching, or other process).

Although FIG. 4 shows a single line of weakness, it is also contemplated that multiple lines of weakness may be provided on one or both of the concave and convex surfaces of a rupture disk.

As illustrated in FIG. 4, the line of weakness 405 is positioned at or near the transition portion 402 of the rupture disk 400. This placement may provide advantages, such as a large opening through which pressurized fluid may escape from a sealed system. It is also contemplated, however, that a line of weakness may be provided at other portions of the rupture disk to achieve desired rupture disk performance (e.g., size and shape of opening, pressure at which the disk will open). For example, in one embodiment, at least one line of weakness may be configured to extend across a transition portion (e.g., 402) of a rupture disk, such that the line of weakness is imparted partially on the domed portion and partially on the flange portion of the rupture disk. Such a line of weakness may be an "X" shape, "C" shape, or other suitable shape. As another example, in one embodiment, a line of weakness may extend from the domed area to the transition between the dome and flange.

The line of weakness 405 is illustrated as a circular line of weakness, which follows the circular perimeter of the central portion of the rupture disk 400. In one embodiment, such a line of weakness 405 may form a complete circle. In another embodiment, however, a line of weakness 405 may form a partial circle (e.g., a half circle, ¾-circle, 300-degree arc). When line of weakness forms only a partial circle, the remaining un-weakened portion may act as a hinge. When the rupture disk tears along the line of weakness, a hinge may prevent the torn material (known as a "petal") from completely separating from the rupture disk.

The line of weakness 405 is illustrated as a continuous line of weakness. It is contemplated, however, that discontinuous, intermittent lines of weakness may alternatively be provided.

The present disclosure is not limited to circular lines of weakness. A line of weakness may, for example, follow an irregular path, eccentric to the rupture disk diameter. Alternatively, a line of weakness may form a complete or partial angular or polygonal shape (e.g., a triangular, square, rectangular, pentagonal, hexagonal, or other shape). In one embodiment, a line of weakness may include a combination of curved and straight or angular segments.

Figure 5A:
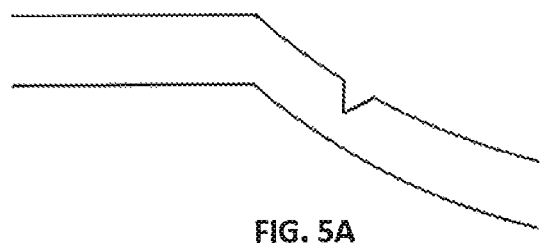
FIG. 5A illustrates a cross-sectional view of a rupture disk having a line of weakness.
Figure 5B:
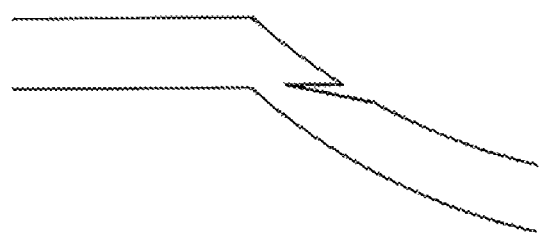
FIG. 5B illustrates a cross-sectional view of a rupture disk having a line of weakness provided at an oblique angle to the disk surface.
Figure 5C:
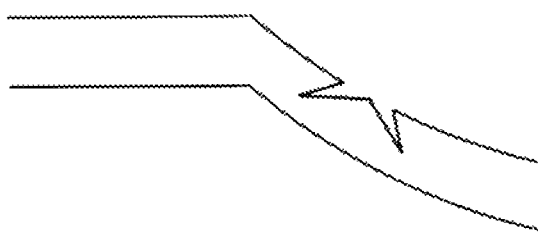
FIG. 5C illustrates a cross-sectional view of a rupture disk having two lines of weakness.

Known lines of weakness are imparted into a rupture disk material in a direction normal to the surface of the rupture disk, due to commonly recognized limitations in traditional scoring technologies. A known line of weakness is illustrated, for example, in FIG. 5A. The present disclosure recognizes, however, that a line of weakness may be imparted at an angle other than normal to the disk surface. The present disclosure recognizes that modern manufacturing technologies (including, e.g., laser ablation) may be used to impart lines of weakness in a number of angles to the disk surface. FIGS. 5B and 5C illustrate embodiments in which one or more lines of weakness are provided at oblique angles to the disk surface. In FIG. 5C, two lines of weakness are provided. The present disclosure contemplates that more than one or two lines of weakness may alternatively be provided. Further, the present disclosure recognizes that the angle of a line of weakness may vary along the line of weakness. Additionally or alternatively, the cross-sectional shape, width, depth, and/or other geometric measures of a line of weakness may vary along the line of weakness. For example, while the lines of weakness in FIGS. 5A, 5B, and 5C are illustrated as V-shaped in cross-section, it is contemplated that all or part of a line of weakness may take other shapes (e.g., square, rectangular, curved, semi-circular, or other shape). A line of weakness may be stepped or follow a zig-zagged shape, for example.

The present disclosure recognizes a number of advantages to imparting lines of weakness at angles other than normal to the disk surface. For example, it is contemplated that the angle of the line of weakness may be selected such that pressure on the rupture disk tends to close the line of weakness, thereby strengthening the disk when under pressure.

Typically, when a rupture disk is provided with a line of weakness, the rupture disk also is provided with a stress concentration point configured to interface with the line of weakness and assist with initiating disk opening. Known rupture disks rely on a separate component, such as a "tooth" projecting from a rupture disk support ring (e.g., 130, 230, 430), which is installed proximate to the line of weakness. It may be desirable, however, to reduce the number of components in a rupture disk assembly. Accordingly, the present disclosure contemplates providing a rupture disk with an integral stress concentrating feature to encourage the line of weakness to open. In one embodiment, the integral stress concentrating feature may be a portion of the line of weakness that is subjected to additional weakening (e.g., through removal of material, indenting, shearing, or other means). In another embodiment, the integral stress concentrating feature may be a second weakened point or line positioned adjacent to, proximate to, or at an angle (e.g., tangential) to the first line of weakness. In yet a further embodiment, the stress-inducing feature may be a point or line of strength located adjacent to, proximate to, or at an angle to the first line of weakness. In another embodiment, the rupture disk may be provided with an incremental stress-inducing feature, such as a tooth or projection attached to (e.g., spot-welded or adhered) or additively manufactured (e.g., 3-D printed) proximate or adjacent to the line of weakness. During manufacture of the rupture disk, such an attached or additively manufactured feature may be added to the disk before, or after, the line of weakness is created. According to one embodiment, when a rupture disk is provided with an integral stress concentrating feature, a support ring (e.g., 130, 230, 430) may be omitted and the rupture disk may be positioned within a holder directly, such as illustrated in FIGS. 3A and 3B.

In the embodiments illustrated in FIGS. 1A-1D, the central portion 103 of the rupture disk 100 is provided with an indent 104. An indent 104 may be placed in the convex surface of the rupture disk (as illustrated) and/or an indent may be placed in the concave surface of the rupture disk (not shown). An indent 104 may be created by any suitable means. By way of non-limiting example, an indent 104 may be created by stamping, shearing, or by removal of material (e.g., by scoring, laser ablation, chemical etching, or other processes).

The indent 104 may be configured to provide an initiation point for reversal of the central portion 103. As illustrated, the indent 104 is positioned at the apex of the central portion 103, in order to initiate reversal of the central portion 103 at its apex. It is contemplated, however, that the indent alternatively may be positioned away from the apex to initiate reversal at another portion of the disk.

Although an indent 104 is illustrated, it is contemplated that other features may be provided to provide an initiation point for reversal. For example, a point of weakness, point of strength, localize thinning of material, or other feature may be provided instead of or in addition to an indentation. Moreover, it is further contemplated that a rupture disk may be provided without an indentation or other feature to provide a specific initiation point for reversal.

Figure 6:
FIG. 6 illustrates a cross-sectional view of a frustum-shaped disk.

The rupture disks illustrated in FIGS. 1A-1D, 2, 3A, 3B, and 4 have dome-shaped central portions. The disclosure is not limited to such configurations. It is contemplated, for example, that principles of the present disclosure may be used with truncated frustum-shaped rupture disks, such as illustrated in FIG. 6.

The rupture disks illustrated in FIGS. 1A-1D, 2, 3A, 3B, and 4 are generally circular. The disclosure is not limited to such configurations. It is contemplated, for example, that principles of the present disclosure may be used with rupture disks having non-circular dome or frustum base. In one embodiment, a rupture disk dome base may take a pentagonal, hexagonal, square, rectangular, or other shape. In one embodiment, such disks may be provided with an irregular line of weakness, as discussed above. According to the present disclosure, the line of weakness may be placed on the dome or frustum itself (rather than on the transition portion or the flange of the rupture disk). Such placement may allow for improved force transmission and tearing of the material upon rupture.

The rupture disks illustrated in FIGS. 1A-1D, 2, 3A, 3B, and 4 are generally radially symmetrical. The disclosure is not limited to such configurations. It is contemplated, for example, that principles of the present disclosure may be used with rupture disks having offset dome shapes (e.g., wherein the apex of the dome is positioned away from the central radial axis of the rupture disk) or offset frustum shapes (e.g., wherein the center of the central portion of the frustum is positioned away from the central radial axis of the rupture disk). In one embodiment, such disks may be provided with an irregular line of weakness, as discussed above. According to the present disclosure, the line of weakness may be placed on the offset dome or angled portion of the frustum itself (rather than on the transition portion or the flange of the rupture disk). Such placement may allow for improved force transmission and tearing of the material upon rupture.

A rupture disk may be positioned within a holder (e.g., 110, 210, 310, 410) to form a rupture disk assembly. In one embodiment, that assembly may be sealingly affixed to an opening of a container, whereby the rupture disk is configured to reverse and/or rupture in response to an overpressure condition in the container.

The present disclosure recognizes, however, that it may be desirable to integrally form a rupturable element directly into the material of a container to be sealed. For example, a container or part of a container may be made of a sheet metal (e.g., aluminum), which may be shaped to include a rupturable element. Such a design provides advantages, such as: material cost savings, manufacturing cost savings, simpler or quicker installation, and reduced or eliminated potential leak points.

One embodiment of an integral rupture element is illustrated in FIGS. 7A and 7B. As shown in the figures, a process or container wall 700 may be shaped to include a rupturable portion 710. The rupturable portion 710 is configured to reverse and/or rupture in response to a predetermined pressure inside the process or container. In the illustrated embodiment, the rupturable portion 710 is circular and dome-shaped. Other shapes of rupturable portions may alternatively be used, as discussed above. In the illustrated embodiment, the rupturable portion 710 is provided with a shear line of weakness 705 and an apex indent 704. It is contemplated that other lines of weakness and/or other indentations may be used, as discussed above.

Another embodiment of an integral rupturable portion is illustrated in FIGS. 8A and 8B. As shown in the figures, a process or container wall 800 may be shaped to include a rupturable portion 810 joined to the wall 800 by a transition portion 802. The rupturable portion 810 is configured to reverse and/or rupture in response to a predetermined pressure inside the process or container. In the illustrated embodiment, the rupturable portion 810 and transition portion 802 are circular, and the rupturable portion 810 is dome-shaped. Other shapes of rupturable portions may alternatively be used, as discussed above. In the illustrated embodiment, a shear line of weakness 805 is provided between the transition portion 802 and rupturable portion 810, and an apex indent 804 is provided in the rupturable portion 810. It is contemplated that other lines of weakness and/or other indentations may be used, as discussed above.

Figure 9A:
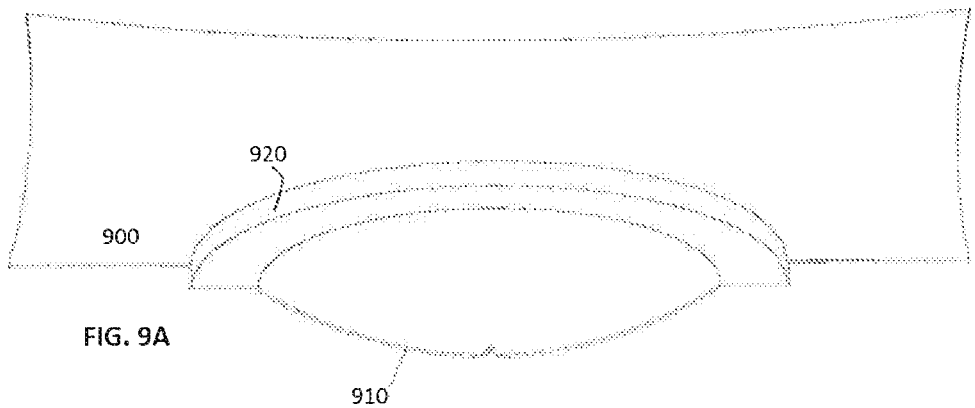
FIG. 9A illustrates a cross-sectional perspective view of another embodiment of a wall including an integral rupture element.
Figure 9B:
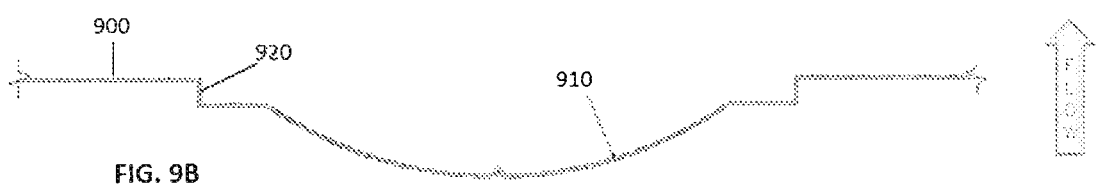
FIG. 9B illustrates a cross-sectional view of the wall of FIG. 9A.

FIGS. 9A and 9B illustrate another embodiment of an integral rupturable portion. As illustrated, a process or container wall 900 may be shaped to include a cylindrical wall 920 and a rupturable portion 910. The rupturable portion 910 is configured to reverse and/or rupture in response to a predetermined pressure inside the process or container. One or more lines of weakness (not shown) may be provided to facilitate rupture of the rupturable portion 910 upon reversal.

Figure 10A:
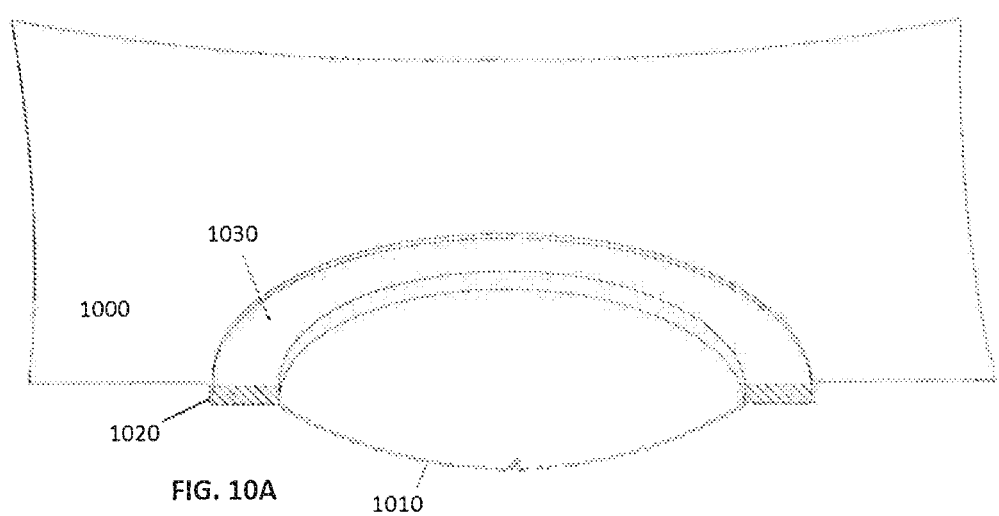
FIG. 10A illustrates a cross-sectional perspective view of another embodiment of a wall including an integral rupture element.
Figure 10B:
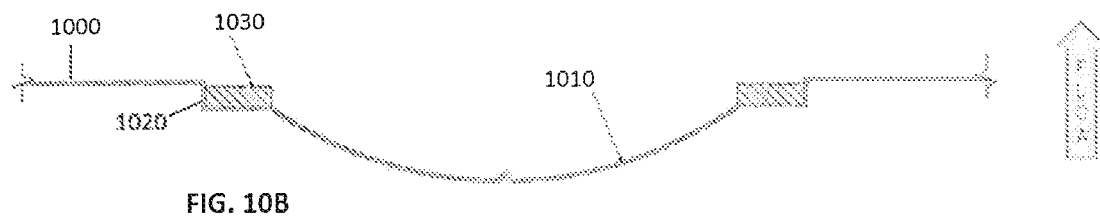
FIG. 10B illustrates a cross-sectional view of the wall of FIG. 10A.

FIGS. 10A and 10B illustrated still another embodiment of an integral rupturable portion. As illustrated, a process or container wall 1000 may be shaped to include a cylindrical wall 1020 and a rupturable portion 1010. A support member 1030 is provided along the cylindrical wall 1020. The support member 1030 may be configured to add burst diameter rigidity to the rupturable portion or to provide stress concentration points, tooth members, or cutting elements (not illustrated) to interact with a line of weakness (not illustrated) to facilitate rupture upon reversal.

In the embodiments illustrated in FIGS. 9A-10B, the rupturable portion and cylindrical wall are circular, and the rupturable portion is dome-shaped. Other shapes of rupturable portions and cylindrical wall may alternatively be used, as discussed above. It is further contemplated that principles of the disclosure may be used with a compound-shape rupture disk. For example, a truncated frustum (e.g., as illustrated in FIG. 6) may connect a flange to a central domed portion. As another example of a compound-shaped rupture disk, the central domed portion of a rupture disk may be joined to the flange portion by way of a second, truncated dome shape having a different radius of curvature. The two domed portions may be positioned concentrically or eccentrically. In a compound-shaped rupture disk, a line of weakness (e.g., an "X"-shaped or "C"-shaped line of weakness) may extend across the transition between the two domed portions.

Although reverse-buckling rupture disks and rupturable portions are disclosed above, principles of the disclosure may also be used with a forward-acting rupture disk (i.e., a rupture disk loaded in tension) or a forward-acting rupturable portion of a process/container wall.

It is contemplated that one or more features of the above-described embodiments may be combined with each other in accordance with the present disclosure.

Other embodiments will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A rupture disk, comprising:
a flange portion;
a reverse-buckling dome portion; and
a transition portion joining the flange portion to the reverse-buckling dome portion;
wherein the dome portion defines an apex, and wherein the dome portion further defines an indentation at the apex;
wherein the rupture disk includes a line of weakness configured to tear upon reversal of the dome portion; and
wherein the line of weakness is a laser-ablated line of weakness imparted into the rupture disk at an angle other than normal to the disk surface.

2. The rupture disk of claim 1, wherein the line of weakness is positioned proximate to the transition portion.

3. The rupture disk of claim 1, wherein the rupture disk further comprises an integral stress concentrating feature configured to apply a concentrated stress to the line of weakness upon reversal of the dome portion.

4. The rupture disk of claim 1, wherein the line of weakness is configured to include a relatively weak segment; and wherein the dome portion is configured to initiate rupture at the relatively weak segment upon reversal.

5. The rupture disk of claim 1, wherein the at least one line of weakness is non-circular, eccentric to a diameter of the rupture disk, angular, or a combination of curved and angular.

6. The rupture disk of claim 1, wherein the base of the dome portion is non-circular.

7. The rupture disk of claim 6, wherein the base of the dome portion is one of square shaped, polygonal, rectangular, pentagonal, or hexagonal.

8. The rupture disk of claim 7, wherein the dome portion defines at least one line of weakness, wherein the at least one line of weakness is non-circular, eccentric to a diameter of the rupture disk, angular, or a combination of curved and angular.

9. The rupture disk of claim 1, wherein the apex is offset from a central radial diameter of the rupture disk.

10. The rupture disk of claim 1, further comprising:
a holder, wherein the holder is configured to crimp the rupture disk into position within the holder.

11. The rupture disk of claim 10, further comprising:
a seal configured to form a fluid-tight barrier between the rupture disk and the holder.

12. The rupture disk of claim 11, wherein the seal is a pocket seal.

13. The rupture disk of claim 1, wherein the line of weakness extends across the transition portion.

14. The rupture disk of claim 1, wherein the reverse-buckling dome portion is a compound dome defining a transition between a first domed region defining a first radius of curvature and a second domed region defining a second radius of curvature; and
wherein the line of weakness extends across the transition between the first domed region and the second domed region.

15. The rupture disk of claim 14, wherein the second domed region is concentric with the first domed region.

16. The rupture disk of claim 14, wherein the second domed region is eccentric with the first domed region.

17. The rupture disk of claim 1, wherein the cross-sectional shape, width, depth and/or angles at which a line of weakness is imparted onto the rupture disk varies along the line of weakness.

18. The rupture disk of claim 1, wherein the angle at which a line of weakness is imparted into the rupture disk is selected to be such that pressure on the rupture disk tends to close the line of weakness, thereby strengthening the disk when under pressure.

19. The rupture disk of claim 1, wherein the line of weakness is intermittent or discontinuous.

20. A rupture disk, comprising:
a flange portion;
a reverse-buckling dome portion; and
a transition portion joining the flange portion to the reverse-buckling dome portion;
wherein the dome portion defines at least one laser-ablated line of weakness imparted into the dome portion at two or more oblique angles to the disk surface; and,
wherein the at least one laser-ablated line of weakness is non-circular, eccentric to a diameter of the rupture disk, angular, or a combination of curved and angular.

21. The rupture disk of claim 20,
wherein the dome portion further defines an apex, and wherein the dome portion further defines an indentation at the apex; and,
wherein the base of the dome portion is non-circular.

22. The rupture disk of claim 21, wherein the base of the dome portion is one of square shaped, polygonal, rectangular, pentagonal, or hexagonal.

23. The rupture disk of claim 20,
wherein the apex is offset from a central radial diameter of the rupture disk.

* * * * *